United States Patent [19]
Gillund

[11] 3,767,002
[45] Oct. 23, 1973

[54] SEAT OCCUPANCY RESPONSIVE AIR CUSHION ACTUATION AND MONITORING CIRCUIT

[76] Inventor: Arden G. Gillund, 9980 S. McGraw, Oak Creek, Wis. 53154

[22] Filed: Aug. 10, 1972

[21] Appl. No.: 279,542

[52] U.S. Cl............ 180/102, 180/103, 280/150 AB, 340/52 H
[51] Int. Cl............................................. B60r 21/10
[58] Field of Search................ 280/150 AB; 180/91, 180/103, 100, 102; 340/52 H, 278

[56] References Cited
UNITED STATES PATENTS

| | | | |
|---|---|---|---|
| 3,622,974 | 11/1971 | Best............................. | 280/150 AB |
| 3,633,159 | 1/1972 | Dillman et al................... | 340/52 H |
| 3,668,627 | 6/1972 | Brainerd......................... | 340/52 H |
| 3,672,699 | 6/1972 | De Windt....................... | 280/150 AB |
| 3,714,627 | 1/1973 | Dillman et al................... | 340/52 H |

Primary Examiner—Kenneth H. Betts
Attorney—Eugene W. Christen et al.

[57] ABSTRACT

A circuit for actuating respective air cushions for the driver and passengers of a vehicle in the event of a collision includes relay contacts connected in the series network for firing the squib which controls inflation of the passenger cushion. When the seat is occupied by a passenger, a seat sensor disables the relay controlling the contact and the series network is armed. If no passenger occupies the seat the relay is energized to open circuit the series network and prevent inflation of the passenger cushion in the event of a collision. Monitoring circuitry indicates to the driver if a malfunction occurs such as the series network being armed while no passenger is present or the series network being open circuited while a passenger is present.

4 Claims, 1 Drawing Figure

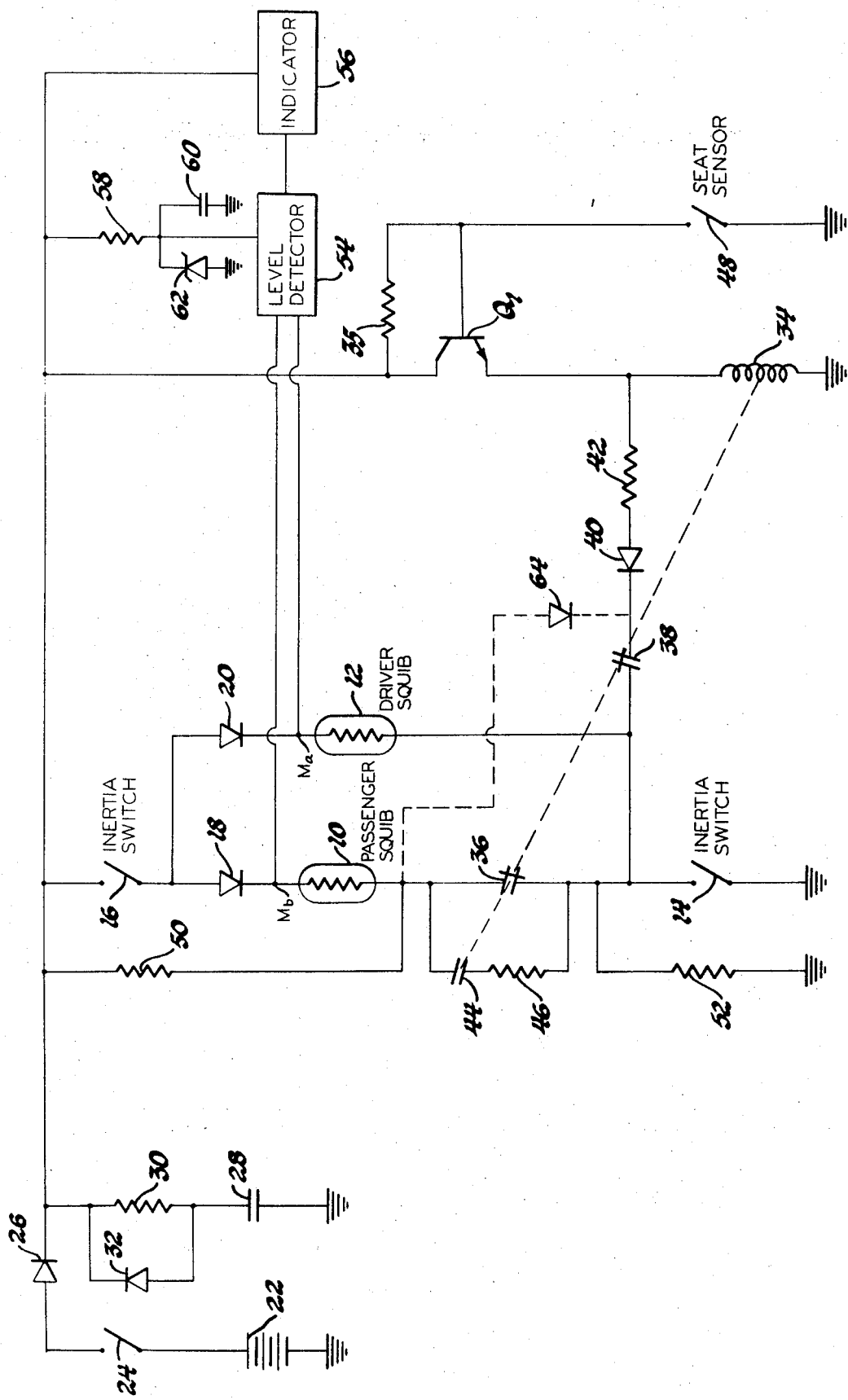

1

SEAT OCCUPANCY RESPONSIVE AIR CUSHION ACTUATION AND MONITORING CIRCUIT

This invention relates to circuitry for controlling inflation of cushions located within a vehicle for protecting occupants of the vehicle in the event of a collision and more particularly to a circuit for controlling inflation of a cushion as a function of whether the occupant to be protected by the cushion is or is not present in the vehicle.

In copending application Ser. No. 190,978, filed Oct. 20, 1971, now U.S. Pat. No. 3,714,627 and assigned to the assignee of the present invention, an actuation circuit is disclosed for initiating inflation of a driver and passenger cushion in the event of a collision. Once the cushions have been inflated, the cushion and associated inflation apparatus must be replaced. Where the vehicle is occupied by only a driver or by a lesser number of occupants than there are cushions installed in the vehicle, the inflation of all of the cushions irrespective to the number and location of vehicle occupants is unnecessary and it would be desirable to eliminate the expense of replacement where inflation of the cushion was unnecessary.

Accordingly, it is an objection of the present invention to provide a circuit for controlling inflation of a cushion located in a vehicle to arrest the forward motion of the occupant of the vehicle, which circuit is disabled when the occupant of the vehicle to be protected by the cushion is not present in the vehicle, and to provide circuitry for continuously monitoring for any malfunction of the circuit disabling means.

In accordance with the present invention an actuation circuit is provided for firing separate squibs for initiating inflation of driver and passenger air cushions located in the vehicle. Each of the squibs is connected across a source of firing potential through a pair of inertia switches which complete the circuit for firing the squibs in response to a predetermined deceleration of the vehicle as might occur during a collision. Normally closed contacts operable by a relay coil are connected in series with the passenger squib. The relay coil is normally energized from the vehicle battery through the ignition switch and a transistor switch. The transistor is rendered nonconductive by actuation of a seat sensor when a passenger occupies the vehicle to thereby disable the relay and arm the passenger squib firing circuit. Accordingly, the passenger squib firing circuit is enabled or disabled depending upon whether the passenger seat is occupied or vacant. The circuit further includes voltage divider means which normally produce a predetermined voltage at a monitoring junction in the actuation circuit. Second normally closed contacts operable by the relay coil are connected between the monitoring junction and the vehicle battery through the transistor so that the voltage at the monitoring junction rises substantially if the relay coil is not energized while the passenger's seat is vacant. Normally open contacts operated by the relay are provided in parallel with the normally closed contacts in the passenger squib firing circuits so that the voltage at the monitoring junction drops substantially if, because of a malfunctioning of the normally closed contacts, the passenger squib firing circuit is disabled while the passenger seat is occupied. Detecting and indicating means connected with the monitoring junction provide an indication to the vehicle driver of the substantial rise or fall in the voltage at the monitoring junction which accompanies a malfunction in the relay.

Referring now to the single drawing, the circuit of the present invention controls the operation of separate air cushions located within the vehicle at the right front passenger and driver positions. The circuit comprises squibs 10 and 12 responsive to predetermined current flow therethrough for respectively initiating inflation of a passenger and a driver cushion. A suitable mechanism for inflating a cushion in response to the current flow through the squibs 10 or 12 is described in copending application Ser. No. 142,533, filed May 12, 1971, by Noel et al., and assigned to the assignee of the present invention. One side of each of the squibs 10 and 12 is connected to ground through a normally open acceleration responsive switch 14 while the other side of the squibs 10 and 12 are connected with a normally open acceleration responsive switch 16 through isolating diodes 18 and 20 respectively. The switch 16 is connected with a source of direct current potential such as the vehicle battery 22 through the usual ignition switch 24 and a diode 26. A suitable acceleration responsive switch is described in copending application Ser. No. 158,170, filed June 30, 1971 by Glenn A. Porter and Norman J. Roth, and assigned to the assignee of the present invention. A storage capacitor 28 is connected across the battery 22 through a resistor 30 and the diode 26 and ignition switch 24 and provides a secondary source of firing potential for the squibs 10 and 12 in the event the battery 22 is disabled during a collision. A diode 32 provides a discharge path for the capacitor 28 in parallel with the resistor 30. The diode 26 prevents discharge of the capacitor 28 through the network leading to the battery 22 in the event this network is shorted during a collision.

A relay coil 34 is connected to the battery 22 through the ignition switch 24 and diode 26 and the emitter-collector electrodes of NPN transistor Q1. A biasing resistor 35 connected between the base and collector of the transistor Q1 biases the transistor to conduction when the ignition switch 24 is closed. The relay coil 34 controls normally closed contacts 36 connected between the squib 10 and the switch 14. The relay 34 also operates normally closed contacts 38 connected to a junction between the squib 12 and the switch 14 and to the emitter of transistor Q1 through a diode 40 and a current limiting resistor 42. The relay 34 also operates normally open contacts 44 connected in series with a current limiting resistor 46 across the normally closed contacts 36. The normally open contacts 44 and resistor 46 maintain circuit continuity in the network comprising the squib 10 when the contacts 36 open since in that event the contacts 44 close. The resistor 46 is sized to prevent current flow through the squib 10 of sufficient magnitude to fire the squib 10 if the switches 14 and 16 close so that the passenger cushion is not inflated unless the contacts 36 are closed. A normally open seat occupancy responsive switch 48 is connected between ground and the base of transistor Q1. The switch may be a conventional pressure actuated switch which closes when the seat is occupied or may be responsive to other indicia of seat occupancy by a passenger such as the sensor described in copending application Ser. No. 228,544, filed Feb. 23, 1972 by Gillund et al., and assigned to the assignee of the present invention.

A voltage divider network comprising resistor 50 and 52 normally establish a predetermined voltage of approximately one-half the potential of the battery 22 at a first monitoring junction $M_a$ between the squib 12 and the diode 20 and a second monitoring junction $M_b$ between the squib 10 and the diode 18. The monitoring junctions $M_a$ and $M_b$ are connected with level detector circuitry generally designated 54 which responds to a substantial rise or fall in voltage level at the monitoring junctions $M_a$ and $M_b$ to energize indicator means generally designated 56. A suitable level detector is described in copending application Ser. No. 190,978, filed Oct. 20, 1971 and assigned to the assignee of the present invention. Battery voltage is applied to the detector 54 through a filter network comprising a resistor 58 and capacitor 60 and is regulated by a zener diode 62.

A diode 64 may, as shown by the dotted lines connection, interconnect the squib 10 with the squib 12 through the normally closed contacts 38 to provide a redundant path for actuation of the squib 10 in parallel with the normally closed contacts 36.

The monitoring junctions $M_a$ and $M_b$ will rise or drop substantially in the event of a malfunction in the firing circuit for the squibs 10 and 12. For example, if the switch 16 becomes short circuited the voltage dividing resistor 50 is shunted when the voltage at the junctions $M_a$ and $M_b$ rise to substantially battery potential. On the other hand, if the switch 14 becomes short circuited the voltage dividing resistor 52 is shunted and the voltage at the junctions $M_a$ and $M_b$ falls to approximately ground potential. Furthermore, an open circuiting of the squibs 10 and 12 will cause the voltage at the junctions $M_b$ and $M_a$ respectively, to rise or fall substantially from the normal one-half battery potential established by the resistors 50 and 52. The change in voltage resulting from any of the aforementioned malfunctions is detected by the level detector 54 to energize the indicator 56 and inform the driver of a malfunction.

In addition to the usual monitoring of the squib firing circuit as aforementioned, the present invention provides monitoring of the relay coil 34 and contacts 36 and 38 for any malfunction thereof. Assuming that the passenger seat is vacant and therefore that the seat sensor 48 is open; when the ignition switch 24 is closed the transistor Q1 is turned on and the relay coil 34 is energized to open the contacts 36 and 38 and close the contacts 44. With the resistor 46 inserted in the series network including the squib 10 and the switches 14 and 16, current flow through the squib 10, in the event of a collision causing the switches 14 and 16 to close, is insufficient to fire the squib 10. Consequently, the passenger's cushion will not be inflated in the event of a collision. With the contacts 38 open, no current flows through the resistor 42 so that the monitoring junction $M_a$ is maintained at approximately 6 volts by the voltage dividing resistors 50 and 52. If for any reason the relay coil 34 is disabled while the seat sensor 48 is open the contacts 36 and 38 will close. Upon closure of the contacts 38 current flows from the transistor Q1 through the resistor 42 and diode 40 and the voltage at the monitoring junction $M_a$ and $M_b$ rises to substantially the potential of the battery 22, i.e. 12 volts. This rise in potential is detected by the level detector 54 and energizes the indicator 56 to inform the operator of a malfunction of the relay 34.

If on the other hand the passenger seat is occupied the base of transistor Q1 will be grounded and will remain nonconductive when the ignition switch 24 is closed thereby preventing energization of the relay coil 34. The contacts 36 and 38 will remain closed and the contacts 44 will remain open. Accordingly, in the event of a collision causing the switches 14 and 16 to close, sufficient current will flow through the squib 10 to fire the squib 10 and initiate inflation of the passenger cushion. If for any reason the contacts 36 do not close upon actuation of the seat sensor 48, both the contacts 44 and 36 will be open. In that event, the voltage at the monitoring junction $M_a$ drops to substantially ground potential and the voltage at the monitoring junction $M_b$ rises substantially to a voltage determined by the drop across the resistor 50 and the squib 10. Either the drop in voltage at the junction $M_a$ or the rise in voltage at the junction $M_b$ is sufficient to energize the indicator 62 and inform the driver of a malfunction of the contacts 36. When the diode 64 is connected and the circuit is shown by the dotted line, the voltage at the junctions $M_a$ and $M_b$ will change only if both the contacts 36 and 38 fail to close.

While only a single passenger squib has been shown, the invention is equally applicable to bilevel systems such as shown in the aforementioned copending application Ser. No. 190,978 wherein relatively high and relatively low inflation rates are provided for the passenger cushion depending upon the G level of the collision.

Having thus described my invention what I claim is:

1. In a passenger conveyance provided with a source of direct current potential, the combination of:
   seat occupancy responsive switch means;
   an inflatable cushion located in said vehicle to arrest forward motion of an occupant of the vehicle, said cushion adapted to be actuated by electrically operated actuator means,
   first and second normally open acceleration responsive switch means connected to opposite sides of said actuator means to form a series network; means for connecting said series network across said source; voltage divider means adapted to be connected with said source for normally establishing a predetermined voltage at a monitoring junction in said series network; relay means comprising a relay coil, and first and second normally closed contact means operable by said relay coil; means connecting said first normally closed contact means in series between said actuator means and said second acceleration responsive switch means whereby said series network is open circuited when said relay coil is energized; relay control means responsive to operation of said seat occupancy responsive switch means for connecting said relay coil to said source during seat vacancy and for disconnecting said relay coil from said source during seat occupancy; means including said relay control means connecting said second normally closed contact means between said source and said junction whereby the voltage at said junction changes from said predetermined voltage in the event said relay coil is disabled during seat vacancy;
   and means connected with said junction for detecting and indicating said change from said predetermined voltage.

2. In a motor vehicle provided with a source of direct current potential; an ignition switch connected in series with said source; first and second inflatable cushions adapted to be actuated by first and second electrically operated actuator means, said first and second cushions being located in said vehicle to arrest forward motion of the driver of the vehicle and a passenger of the vehicle respectively, the combination of:

an actuation circuit for operating said first and second actuator means and comprising first and second normally open acceleration responsive switch means connected to opposite sides of said first actuator means to form a series network; means for connecting said series network across said source; relay means comprising a relay coil and first and second normally closed contact means operable by said relay coil, switch means responsive to occupancy of the vehicle by a passenger, relay control means connected with said seat occupancy responsive switch means for controlling energization of said relay coil whereby said relay coil is enabled in response to seat vacancy and is disabled in response to seat occupancy; means connecting said first normally closed contact means in series with said second actuator means between said first and second acceleration responsive switch means whereby said second actuator means is disabled in response to seat vacancy; voltage divider means adapted to be connected with said source for normally establishing a predetermined voltage at a monitoring junction in said series network;

indicator means;

means responsive to a change in voltage from said predetermined voltage at said monitoring junction for energizing said indicator means;

means including said relay control connecting said second normally closed contact means between said source and a junction between said first normally closed contact means and said second acceleration responsive switch means whereby the voltage at said monitoring junction changes from said predetermined voltage in the event said relay coil is disabled during seat vacancy.

3. The circuit defined in claim 2 wherein said relay means further includes normally open contact means operable by said relay coil; a resistor connected in series with said normally open contact means across said first normally closed contact means whereby the voltage at said monitoring junction changes from said predetermined voltage in the event said first normally closed contact means does not close in response to disabling of said relay coil.

4. The circuit defined in claim 3 further including a diode interconnecting said second actuator means with said second normally closed contact means to provide a current path between said second actuator means and said second acceleration responsive switch means in parallel to said first normally closed contact means and wherein said means connecting said second normally closed contact means with said source includes a second diode poled to prevent current flow through said first mentioned diode or second normally closed contact means to said relay coil.

* * * * *

PO-1050
(5/69)

UNITED STATES PATENT OFFICE
CERTIFICATE OF CORRECTION

Patent No. 3,767,002          Dated October 23, 1973

Inventor(s) Arden G. Gillund

It is certified that error appears in the above-identified patent and that said Letters Patent are hereby corrected as shown below:

Before the REFERENCES CITED, after "[76] Inventor: Arden G. Gillund, 9980 S. McGraw, Oak Creek, Wis. 53154" insert -- [73] Assignee: General Motors Corporation, Detroit, Mich. --

Signed and sealed this 19th day of November 1974.

(SEAL)
Attest:

McCOY M. GIBSON JR.          C. MARSHALL DANN
Attesting Officer          Commissioner of Patents